Dec. 6, 1938.  L. C. COLE  2,139,402

MACHINE TOOL

Original Filed March 5, 1934    6 Sheets-Sheet 1

Inventor
Lyndon C. Cole
By
Marechal & Noe
Attorney

Dec. 6, 1938.  L. C. COLE  2,139,402
MACHINE TOOL
Original Filed March 5, 1934  6 Sheets-Sheet 2

Inventor
Lyndon C. Cole
By Marechal & Noe
Attorney

Dec. 6, 1938.  L. C. COLE  2,139,402
MACHINE TOOL
Original Filed March 5, 1934  6 Sheets-Sheet 3

Inventor
Lyndon C. Cole
By
Marechal & Nor
Attorney

Dec. 6, 1938.　　　　　L. C. COLE　　　　2,139,402
MACHINE TOOL
Original Filed March 5, 1934　　6 Sheets-Sheet 4

Inventor
Lyndon C. Cole
Marechal & Roz
Attorney

Dec. 6, 1938.  L. C. COLE  2,139,402
MACHINE TOOL
Original Filed March 5, 1934  6 Sheets-Sheet 6

Inventor
Lyndon C. Cole
By Maréchal + Noe
Attorney

Patented Dec. 6, 1938

2,139,402

UNITED STATES PATENT OFFICE 2,139,402

MACHINE TOOL

Lyndon C. Cole, Hamilton, Ohio, assignor to General Machinery Corporation, Hamilton, Ohio, a corporation of Delaware Application March 5, 1934, Serial No. 714,044
Renewed August 21, 1936

16 Claims. (Cl. 29—33)

This invention relates to machine tools adapted to perform desired cutting operations on work pieces.

One object of the invention is the provision of a process of performing broaching and other interrelated sequential operations in timed relationship on an advancing line of work pieces by which the desired machining operations can be carried out on the work pieces in a rapid manner.

Another object of the invention resides in such a process, in which the work pieces are mounted in similar fixtures which are advanced step by step into and through a machine and from one machine to another.

Another object of the invention is the provision of apparatus for carrying out the above process.

A further object of the invention is the provision of a novel machine adapted for cooperation with successive work carrying fixtures for performing broaching or other machine operations on successive work pieces.

A further object of the invention is the provision of a broaching machine of strong and rugged construction and arranged to rapidly broach or machine surfaces of heavy articles.

Other objects and advantages of the invention will be apparent from the following description, the appended claims and the accompanying drawings, in which,—

The invention as herein set forth is described, for purposes of illustration, as applied to the machining of engine cylinder blocks, but it will be apparent that work pieces of various sorts and forms and requiring various machine operations may be operated upon in accordance with the process and by the apparatus herein set forth. Furthermore as herein described, the invention comprises machines for broaching and drilling the work pieces, but other types of machines adapted for cutting the work may be employed in conjunction with or in place of the drilling or the broaching machines herein described.

The machine illustrated in Figs. 1 to 4 and 5 to 12 is particularly adapted for broaching operations, it being shown as provided with broaching tools for finishing the upper surfaces of the cylinder banks of a V-shaped cylinder block of an automobile engine. The broaching machine, which will be referred to generally by the reference numeral 10, comprises a fixed base 11, the upper portion of which is arranged to carry and support work carrying fixtures such as the fixture 12 in which the engine block 13 or other work piece is received and held. The fixture 12 is slidably supported on the guide or track 14 of the machine base, the fixture and the base being provided with cooperating flat surface plates 15 so that the fixture can be readily moved along the guide. On opposite sides of the fixture are downwardly and inwardly extending arms or sides 16, preferably provided with rollers 17 which operate in engagement with the inclined sides 18 of the base guide, the sides 16 cooperating with the sides of the guide to prevent excessive movement of the fixture out of the line of forward travel centrally of the machine. However, there is some small distance or clearance between the sides of the guide and the fixture sides 16 so that a small limited lateral movement of the fixture on the track is possible.

The engine block 13 is preferably provided with several small locating holes 20 drilled in the bottom of the block, and cooperating with locating pins 21 which project up from the bottom of the fixture to locate the block in the fixture in a definite predetermined position with respect thereto. The lower side of the block is finished to provide a smooth surface which rests on finished support strips 22 fixed in the fixture, and the block is held firmly against the support strips by means of clamps 23 which press downwardly on opposite end portions and thus securely hold the block against any movement in the fixture with the block definitely located by the cooperating pins and holes 21 and 20. Before tightening the clamps a stop screw 24 which is threaded in the side of the fixture is turned until its inner end abuts abainst the end of the cylinder block for transferring lateral forces, created on the block during broaching, directly to the fixture wall.

The base 10 supports the fixed frame portion of the machine which is herein shown as embodying four rods or pillars 25 carrying the frame top 26. The machine frame movably carries a head 27 which is adapted for vertical movement, being provided with vertical bores through which the rods 25 extend, the rods thus guiding the head in its vertical movement. The weight of the head is counter-balanced by springs 28 which bear at their lower ends against the base 11 and which press upwardly on the lower side of the head.

Figures 1, 2, 4, 15:
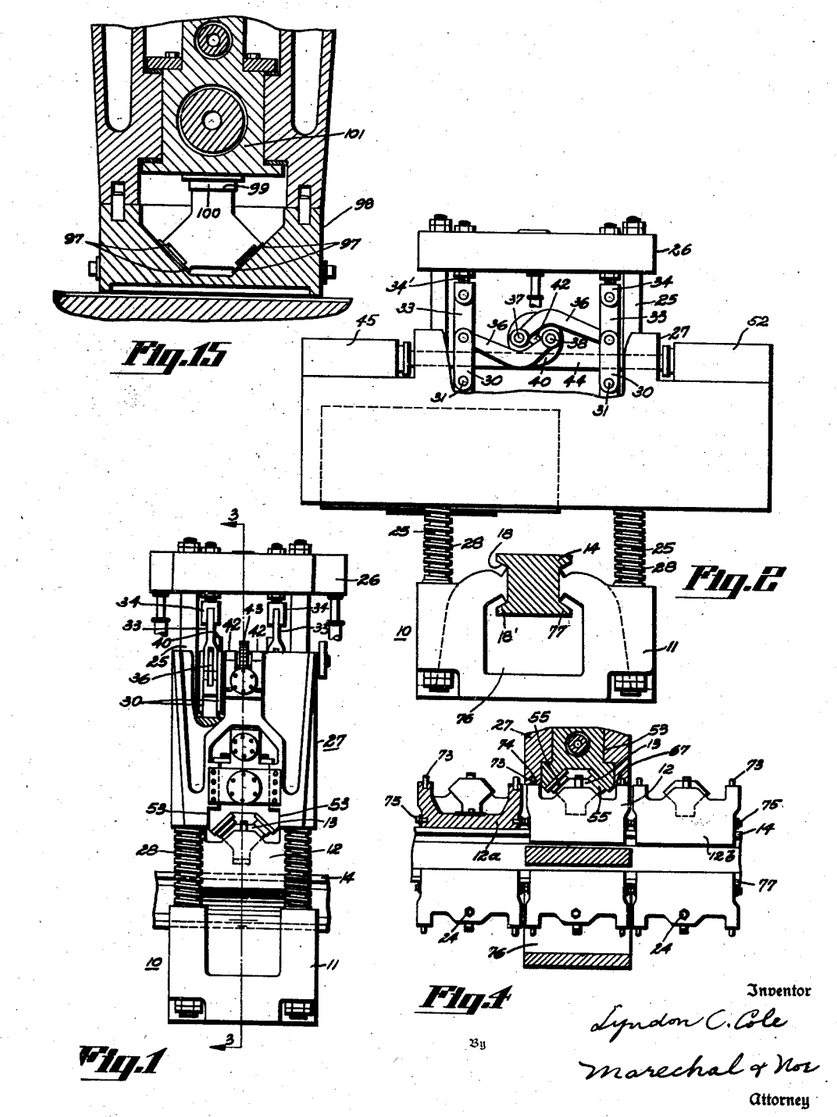
Fig. 1 is a side elevation of a machine embodying the present invention and adapted for broaching operations on a work piece.
Fig. 2 is a front elevation of the machine illustrated in Fig. 1, portions being broken away for purposes of illustration.
Fig. 4 is a central sectional view on the line 4—4 of Fig. 3 but showing the tool in engagement with the work.
Fig. 15 is a sectional view corresponding to Fig. 4 but illustrating a portion of the machine adapted for finishing the bottom surface of a cylinder block.
Figure 3:
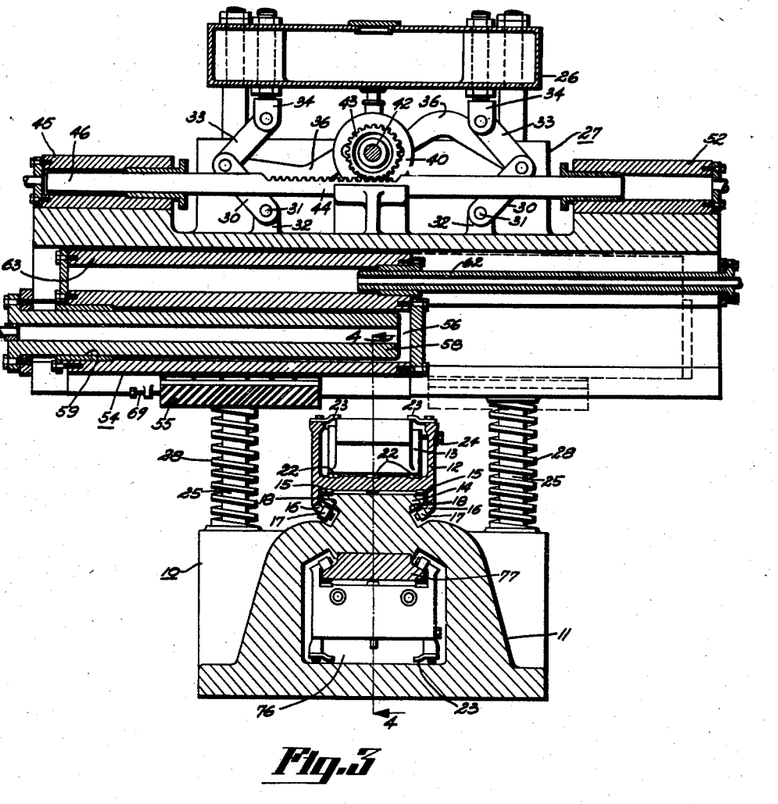
Fig. 3 is a central vertical section on the line 3—3 of Fig. 1, but with the tool carrying portions of the machine shown in an elevated position.
Figure 5:
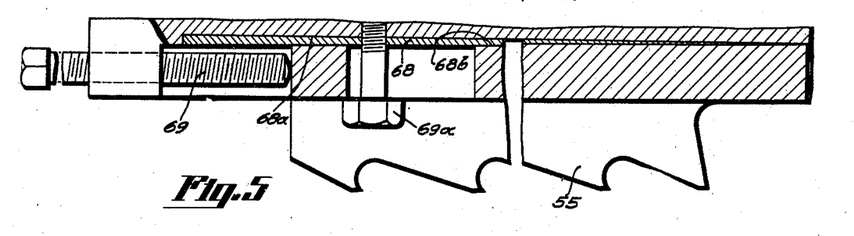
Fig. 5 is a section of a portion of the broach showing its adjustable mounting.
Figure 6:
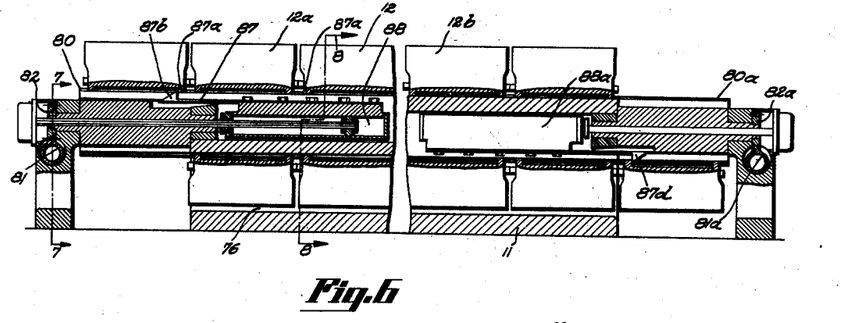
Fig. 6 is a central section of portions of the tracks and the transfer tables provided at the ends of a machine line for inverting the work carrying fixtures.
Figure 7:
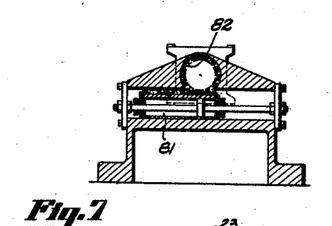
Fig. 7 is a section of a transfer table.
Figure 8:
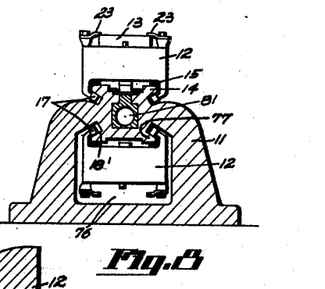
Fig. 8 is a vertical section on line 8—8 of Fig. 6.

Near the upper portion of the head, as shown in Figs. 1 to 3, the latter is provided with four links 30 which are pivotally connected at their lower ends to pins 31 carried by projections 32 fixed on the head. The upper ends of the links 30 are pivotally connected to cooperating links 33 which are pivoted at their upper ends to projections 34 of the frame top 26. The projections 34 are preferably adjustable vertically with respect to the top 26 so the head can be adjusted to a desired horizontal position and providing an adjustment by which the lower limiting position of the head may be varied. The links 30 and 33 provide toggle connections between the upper portion of the head and the frame top, the pins which interconnect the links 30 and 33 being connected to operating arms 36 which extend to operating crank pins 37 and 38 projecting laterally from two operating disks 40. When the operating disks are rotated counter-clockwise from the position shown in Fig. 3, the toggle links are straightened, thus lowering the head into such a position as to bring the broaching tools, which are reciprocably slidable in the head, into operative cutting relationship with the work.

The two operating disks 40 are fixed to a common transverse operating shaft 42 on which is also fixed the centrally arranged operating gear 43 which engages with a rack 44 movable longitudinally in the upper portion of the head. The rack may be moved to the right from the position shown in Fig. 3 by supplying fluid under pressure to the pressure fluid operated cylinder 45, one end of the rack being formed as a piston 46 operating in the cylinder 45. The fluid, such as oil or the like, may be supplied through a suitable pipe line in a manner to be more fully described. Pressure fluid may also be supplied to a pipe connected to an opposing or right-hand cylinder 52 by means of which the rack is moved toward the left or to the position shown in Fig. 3 in order to raise the head vertically away from the work.

The head 27 slidably supports the carriage 54 to which the broaching tools 55 are fixed, cooperating guide surfaces 53 being arranged on the head and on the carriage so the carriage is movable vertically with the head but can slide horizontally in the head during broaching operations. The carriage is provided with or fixed to a cylinder 56 which may be supplied with fluid under pressure in order that the carriage may be moved toward the right (see Fig. 3) thus bringing the broaching tools into effective or cutting engagement with the work. The piston 58 which cooperates with cylinder 56 is fixed to the head 27, the cylinder 56 being in fluid-tight sliding engagement with the piston at 59. The carriage 54 is returned or moved toward the left by supplying fluid under pressure to a pipe which extends through the piston 62 which is fixed to the head and which is adapted for cooperation with the return cylinder 63 of the carriage.

When the cylinder 45 is energized the head is moved down, bringing the lower end 67 of the head down firmly against the upper end portions of the fixture 12 with a force that preferably exceeds the upward reaction force that will be created when the broaching tool engages and operates on the work. Initial adjustment of the projections 34 provides for the regulation of the downward forces created by the head portion 67 against the fixture so that a tension load is applied initially to the rods 25 somewhat in excess of the vertical reaction forces produced by the broach when engaging the work. Thus all the machine parts are pre-loaded to such an extent as to prevent yielding movement of the parts during operation. After the head is moved down fluid is supplied to cylinder 56 to cause the broaching tool carriage to move horizontally for cutting effect upon the work. The speed of the broach may be about 25 feet per minute or at any other suitable speed.

As will be seen from Figs. 1 and 3, the track or guide 14 of the base extends longitudinally from a central portion upon which a fixture is arranged when the work it carries is being broached. The fixture 12 is followed by a second similar fixture 12a also mounted on the track provided by the guide 14. Furthermore, another fixture 12b is arranged ahead of the fixture 12 and still other fixtures precede fixture 12b as may be required.

Suitable means are provided for moving the line of fixtures along step by step through a distance equal to the length of a fixture, so that when the broaching operation is completed on the work carried by the fixture 12, the fixture 12a will be pushed ahead a distance corresponding to its length, thus advancing the fixture 12 and pushing both the fixture 12 and the fixture 12b along so as to bring the work carried by fixture 12a into position for a broaching operation.

Figure 9:
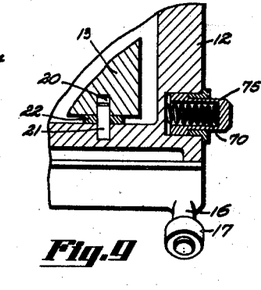
Fig. 9 is a sectional view of an end portion of a fixture.
Figure 10:
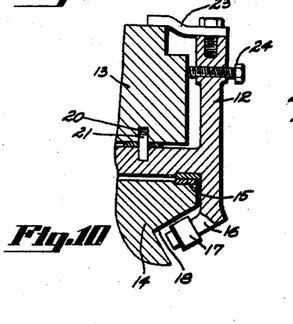
Fig. 10 is a sectional view of a side of a fixture.

Each of the fixtures is provided with a locating pin or projection 73 which extends upwardly and which is adapted to be received by a cooperating locating recess 74 provided in the lower side of the head portion 67. If the amount of feed given to the line of fixtures is not absolutely accurate, the locating pin 73 and the cooperating hole 74 will exactly position the fixture carrying the work to be broached when the head of the machine descends. The cooperating pins 73 and holes 74 also serve to shift the fixture transversely of the line of advance any small distance required to bring the work into its exact position, as the fixture merely floats on the top of the track, and is not exactly positioned until the head of the machine descends. Each fixture is preferably provided with projecting studs 75 at its ends, the distance between the ends of the studs 75 of each fixture being some predetermined distance corresponding to the length of a feeding step of the line of fixtures. One of the studs 75 of each fixture is permitted some small limited yielding movement with respect to its fixture, being pressed outwardly by a spring 70 as shown in Fig. 9. The spring 70, however, is strong enough to normally maintain the stud 75 extended during advancing or feeding steps of the fixtures.

The fixtures may be fed forward by suitable drive means operated in timed relationship to the broaching operations carried out by the machine. The fixture at the rear end of the line is stepped along by a fluid pressure system comprising a longitudinally movable cylinder which is operated in timed relationship to the machine and which is adapted to be moved forward the length of a fixture and to be then returned so as to engage another fixture brought up into alignment with the advancing line.

As will be apparent from Figs. 2 and 3, there is a large passage 76 in the base 11 of the machine, large enough for the return passage of the fixtures. After advancing to the end of the track 14, the fixture is pushed onto a rotatable table which is then turned so as to invert the fixture, after the work has been removed from it. The inverted fixture is then moved back through the machine, passing through the space 76 in a direction contrary to its advancing feed. In its returning movements, the fixture is suspended on lower return tracks 77 provided by the base, tracks 77 being of similar form to the tracks 14. The distance between the upper and lower tracks is preferably quite small to provide a compact machine construction. In its suspended position the weight of the fixture is carried by the rollers 17 which operate along the inclined guide surfaces 18' of the tracks 77. The return movement of the fixtures is also a step by step movement, fluid pressure or other means being arranged to shove the returning line of fixtures through steps corresponding in length to the length of the fixtures.

The broaching machine that has been described is adapted for broaching large surfaces of comparatively large work pieces such as engine blocks and the like. Each broach 55 is provided with a large number of cutting edges, as shown in the fragmentary view, Fig. 5, these edges extending at a suitable lateral angle. Each cutting edge projects below the level of the preceding cutting edge and the various cutting edges therefore operate successively to surface the work piece. The total amount of metal taken off by the broach may be about .18" in a broach having about thirty teeth with each tooth projecting about .006" below the preceding tooth. The broach is preferably mounted adjustably in the broach carriage by a wedge 68 which bears at its upper surface on a horizontal surface portion 68a of the carriage. The plane containing the cutting edges is substantially parallel to the top surface 68b of the broach 55. Longitudinal adjustment of the broaching tool 55, effected by an adjusting screw 69 or the like has the effect of lowering or raising of the entire broach through small distances sufficient to compensate for wear of the cutting edges. Bolts 69a securely clamp the broach to the carriage in any desired position of adjustment.

The movement of the broach in the machine described is transverse to the direction in which the work is fed to, through and from the machine so that the chips removed by the broach will fall on opposite sides of the track which supports the fixtures, or will fall within the fixture and between the ends of the fixture and the work. Then when the fixture is inverted at the end of the machine or at the end of a line of machines, the chips fall out and can be readily removed, but they will not fall on the guide track or rail which is therefore kept clean at all times.

Figure 14:
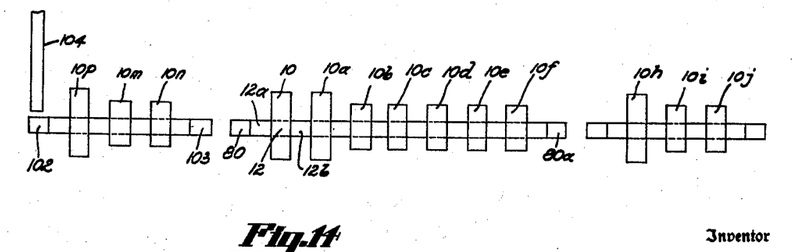
Fig. 14 is a diagrammatic top plan view of a series of machines arranged for broaching and other interrelated sequential operations in accordance with the present invention.

While the machine 10 may be employed independently of other machines for carrying out a desired broaching operation, it is a part of the present invention that a machine of this character, or a machine adapted for machining operations on successive work pieces arranged for advancing movement through the machine in the general manner above set forth will be employed in conjunction with other machines adapted to perform related or sequential operations that have heretofore been performed by different and unrelated tools. Thus the broaching machine 10 as shown in Fig. 14 may be one of a series of machines arranged in a line comprising the machines 10, 10a, 10b, 10c, 10d, 10e, 10f, and additional machines as may be required. For example, let us assume it is desired to broach the cylinder banks, then broach the horizontal top of the block and to follow these operations by a number of drilling, tapping and boring operations. All these operations may be quickly and accurately carried out in sequence by the line of machines 10, 10a, 10b, etc., the machine 10a generally corresponding to the machine 10 but provided with a broaching tool adapted to cut the horizontal top surface of the cylinder block. The machine 10b is provided with a number of drills or other similar cutting tools that perform the required drilling operations in the cylinder banks. Machine 10c may perform tapping operations on the drilled holes. Machine 10d can drill other holes. Machines 10e and 10f can bore and finish the cylinder walls. All the machines of the line, however, are provided with similar and cooperating guide or track means, and are arranged in line, with the guide tracks or rails of one machine forming continuations of the guide tracks or rails of an adjacent machine so that the fixtures can carry the work to a machine and from it to the last machine in the line, stopping at each machine for the required operation on the work before it advances another step. The space between the machines corresponds to the length of one or more fixtures so that while one fixture is in operating position in each machine, interposed fixtures are provided between the two machines, ready to be advanced to a proper location in a machine at the next feeding stroke. Thus the fixture 12b is interposed between the fixture 12 in machine 10 and a fixture centered in machine 10a. Fixture 12a carrying the work piece that has been operated upon in machine 10 for a surfacing operation on the cylinder banks, as will be apparent, is accessible to the operator, who is enabled to remove the clamps 23 applied to the horizontal top of the block, and replace them in engagement with the cylinder banks in such a way as to leave the horizontal top without obstruction so that surface can be finished in the machine 10a. This changing of the clamps is carried out by the operator while the fixture 10b is stationary between the two machines.

At the left-hand end of machine 10, as viewed in Fig. 14, the track continuation is in the form of a rotatable table 80 having upper and lower fixture guide surfaces arranged normally in line with the upper and lower guiding surfaces or tracks of the machine. However, the table is rotatable about a horizontal axis which is parallel to the line of advancing movement of the fixtures and centrally below between the upper and lower tracks. The empty fixtures are returned by suitable indexing means such as a fluid pressure pushing cylinder 88a arranged at the end of the line, providing for step by step movement of the fixtures with each step corresponding to the length of a fixture. Each time the line of returning fixtures is moved to the left as viewed in Figs. 6 and 14 a fixture is moved on to the lower guide rails of the table 80. The table 80 is then rotated through 180° by means of a turning cylinder 81 shown in Fig. 7 having rack teeth engaging with a gear 82 fixed to the table. When fluid pressure is supplied to either end of the cylinder the cylinder moves endwise and rotates the able 180°, the direction of rotation depending on which end of the cylinder is energized. After moving the table through 180° the fixture on the table is brought into exact alignment with the upper fixed guide surfaces of the machine 10. A cylinder block is then applied to the fixture while it is on the table and before it is advanced into the central portion of the machine 10. The fluid pressure cylinder 88 is then energized by fluid pressure so that the cylinder is moved to the right as viewed in Fig. 6 and the fixture is thus pulled forward by the arm 87, which engages a depending wall 87a on the fixture, through a distance sufficient to take up any small space between the fixture on the table, to which the cylinder block is applied, and the fixture 12a ahead of it, and to move the whole line of fixtures through a distance equal to the length of a fixture. This places a fixture to which a work piece has been applied one step closer to the machine 10 and advances the other fixtures in the line the proper predetermined distance. The feeding cylinder is preferably housed for slidable movement in an opening in the track forming portion of the machine base. The lug 87b on the arm 87 is movable in a slot extending longitudinally along the upper fixed track or guide. The lug 87b is carried yieldingly by arm 87 and is adapted to spring up into engagement with the wall 87a of a fixture on the table when the cylinder 88 reaches the end of its movement to the left. The return feed for the fixtures is of similar construction except that the lug 87d extends downwardly for engagement with the inverted fixture on the table 80a, which is rotated by a gear 82a, and a rack on the turning cylinder 81a.

In the machine 10 the banks of the cylinders are broached as above described, the fixture then advancing to the space between the machines 10 and 10a. The next step is the advance of the fixture into the machine 10a which provides the desired broaching operation on the top of the cylinder block. A further step carries the fixture along the tracks extending between machines 10a and 10b. Another step takes the fixture into the machine 10b in which the desired drilling operations are carried out on the cylinder banks. Each fixture thus travels the entire length of the line of machines stopping at each machine for the intended operation and then moving on again until all the operations are completed. The various operations are rapidly carried out as the broaching operation is very rapid, and as no time is lost in positioning the work pieces in the various machines. Each fixture is exactly positioned in a machine by the holding means or head with which each of the machines of the line is provided. It will be understood that each holding means of each broaching and drilling machine is provided with locating holes in a movable clamping or holding head, cooperating with the pins 73 of the fixtures, the springs 70 of the studs 75 permitting limited yielding compression of the fixtures, if necessary, between any two machines. When the fixture reaches the end of the line of machines it is rotated through 180° by the table 80a thus dumping the chips from it and moving it into alignment with the rails or guide surfaces on the lower side of the machine along which the fixtures are returned. When the fixture reaches the table 80a, the work, or cylinder block is removed from it before the table is inverted.

After passing through the line of machines comprising the machines 10, 10a, 10b, etc., the ends of the cylinder block may be broached, the blocks first being applied to suitable fixtures for exposing their end surfaces. The fixtures are supplied to the machine 10h which carries out this operation and which may be followed by an additional machine or machines 10i and 10j for carrying out other operations if desired, by tracks and advancing means similar to those employed in machines 10, 10a, 10b, etc.

Before supplying the fixtures to the machine line comprising machines 10, 10a, 10b, etc., the bottom of the cylinder blocks may be broached in a machine 10p, and any drilling or other operations required in addition may be carried out in a machine or a plurality of machines 10m, 10n, etc., the machines 10p, 10m and 10n being arranged in a line similar to the line including machines 10. The cylinder blocks are applied to a fixture 98, see Fig. 15, with the bottoms 99 of the blocks facing upwardly and with the blocks held firmly in the fixtures which are otherwise similar in construction to the fixtures 12. Before applying the blocks to the fixture 98, spots 97 are milled on the cylinder banks, and the cylinder block can then be held on the fixture 98 with the finished spots bearing on the finished inclined surfaces of the fixture, as shown in Fig. 15. The broach 100 is carried by a carriage 101 which is similar in construction to the carriage of the machine 10, the other parts of the machine also corresponding to the form of construction previously described. The guide rails or tracks extend from a rotatable table 102 at the left-hand end of machine 10p as viewed in Fig. 14, through and between the machines 10p, 10m and 10n, ending with a rotatable table 103 which inverts the fixtures so that they can be returned to the left after passing through the machine 10n. The advancing and returning means may be similar to the fluid pressure cylinders previously described for the advance and return of fixtures 12. The machine 10m may be employed for drilling the locating holes 20 in the cylinder block bottom surfaces to subsequently serve to exactly position a cylinder block on a fixture 12 in cooperation with the fixture pins 21. When the fixture 98 reaches the table 103, the work is removed and applied to a fixture 12 on the table 80 on the second line of machines. 104 generally represents a conveyor which carries the cylinder blocks along to a point adjacent the table 102.

It will be apparent that the various operations carried out by the several machines in a line such as the line comprising machines 10, 10a, 10b, etc., may not all require the same amounts of time for completion. Thus the broaching operation may be carried out in only a small portion of a minute, while a somewhat longer period of time may be required for the drilling operations of the machines 10b, 10c, etc. The amount of time required for the longest operation will therefore determine the time period between advancing steps of the fixtures. The various operations, however, are carried out on a plurality of work pieces in timed relationship and in proper sequential manner so that all the machine operations consume only a comparatively small amount of time. Thus there are a plurality of interrelated units adapted for performing a plurality of related or sequential operations of a character heretofore performed by different and unrelated tools. The operator of the several machines of a line is not required to carefully chuck each piece in each machine, as the machine itself automatically receives and centers the fixture and carries out the required operations without attention. The operator therefore need only supply the cylinder blocks or other work to the fixtures and remove them from the fixtures at the end of the line for transfer to another line of machines or to a conveyor by means of which they can be removed to a desired point.

Figures 11, 12:
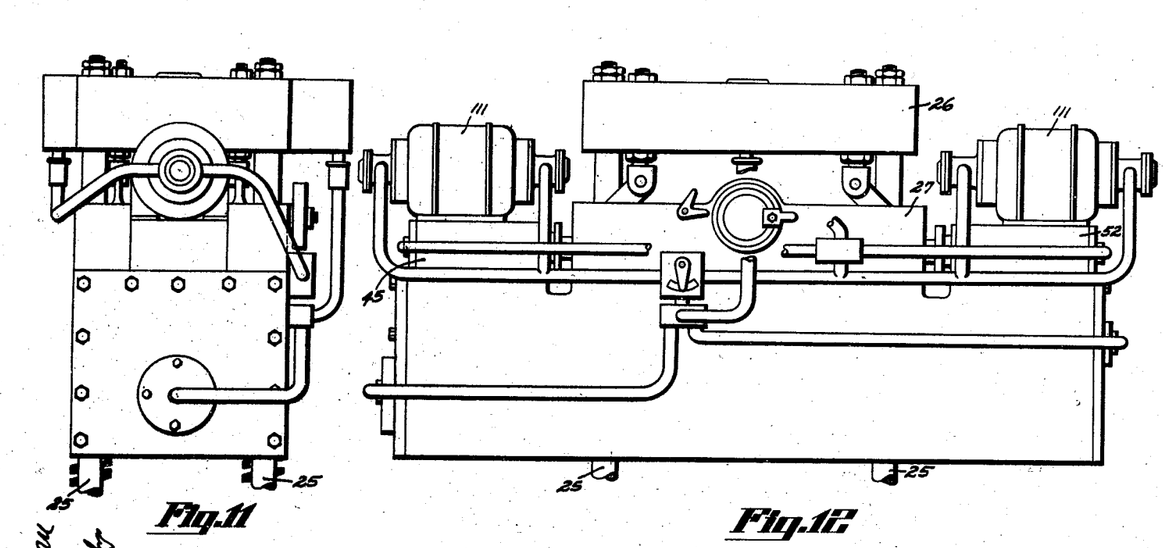
Fig. 11 is a side elevation of the upper portion of a broaching machine.
Fig. 12 is a front elevation of the upper portion of the machine.
Figure 13:
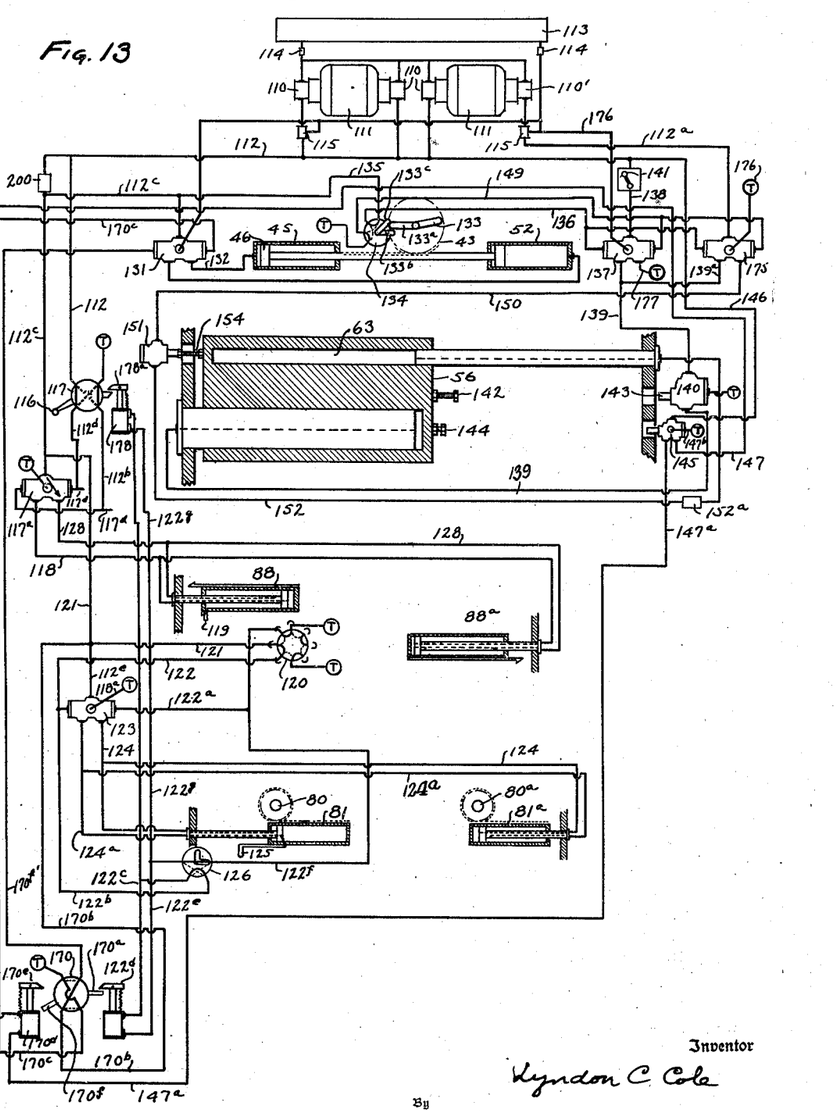
Fig. 13 is a diagram of the fluid pressure control system.

The various controls for receiving and lowering the head, for advancing and returning the broach, and for indexing and turning the fixtures at the end of a line are shown diagrammatically in Fig. 13, Figs. 11 and 12 illustrating the positioning of some of the parts of the fluid pressure control system as applied to machine 10. Fluid pressure is supplied by four pumps operated by the two motors 111 that can be mounted upon the raising and lowering cylinders 52 and 45. Three of these four pumps indicated by the reference numeral 110 supply oil or other fluid under pressure to a common pressure line 112, receiving the fluid from the supply tank 113 which can be housed in the machine top 26. The fourth pump 110' supplies fluid under pressure to another pressure line 112a. Inasmuch as the motors move up and down with respect to the tank, suitable telescopic or flexible connections 114 are provided in the supply pipes leading from tank to pump. 115 designates relief valves arranged to return fluid from the higher pressure sides of the pumps back to the tank when some predetermined pressure is reached.

Figures 16, 17, 20:
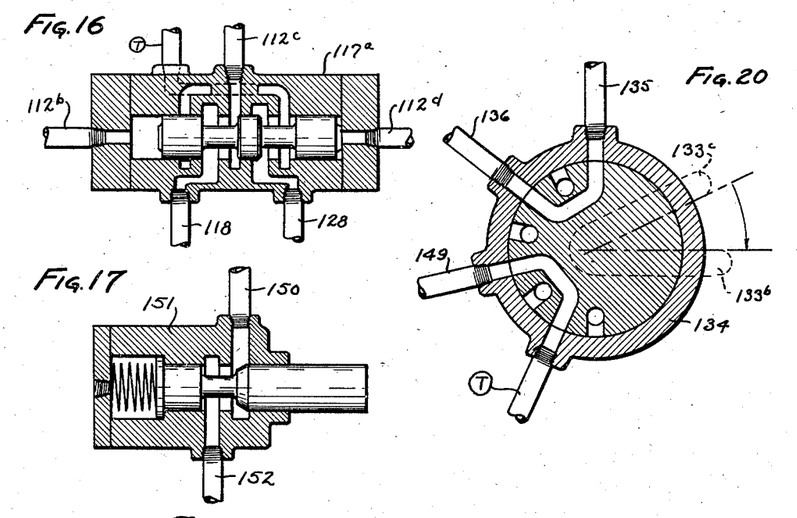
Fig. 16 is a central sectional view showing the construction of the valve 111a, and its connections.
Fig. 17 is a sectional view through the valve 151.
Fig. 20 is a sectional view through the valve 134.

At the start of an operation the operator pulls a starting lever 116 downwardly from the position shown, mechanically moving a control valve 117 to a second position shown in dotted lines. This connects the pressure line 112 through a pilot line 112b to the left-hand side of piston valve 117a moving the piston to the right and thus connecting line 112c to a line 118. The construction of valve 117a will be apparent from Fig. 16. Line 112c is connected to pressure line 112 through a pressure reducing valve 200. When the piston of valve 117a moves to the right fluid is exhausted from the right-hand side of the valve through a line 112d back to the tank.

Line 118 is in communication with the right-hand side of the feeding cylinder 88. The cylinder 88 is thus moved to the right when the valve 117a is moved as above described, pulling a fixture from the upper side of the table 80 through a distance corresponding to the length of the fixture. At the same time fluid under pressure is supplied from the pipe 118 to the left-hand end of cylinder 88a which causes the return movement of the fixtures.

At the end of the feeding step of the fixtures, a pivoted finger or latch 119 on the movable cylinder 88 engages one of the eight arms on pilot valve 120 causing the rotary pilot valve 120 to move clockwise 45 degrees from the position shown, supplying fluid as shown in dotted lines through valve 120 from a fluid pressure control or pilot line 121 to a line 122 which extends to the left-hand side of the control piston of a valve 123, the construction of which is similar to the valve 117a. The piston of valve 123 is thus moved to the right opening communication from a line 112e to line 124 so that fluid is supplied to the left-hand end of cylinder 81 and to the left-hand end of the cylinder 81a by means of which the transfer tables 80 and 80a are rotated. When the piston of valve 123 is moved to the right fluid is exhausted from the right-hand side of the piston through line 122a which at that time connects to the tank through valve 120. When the cylinders 81 and 81a move to the left as above mentioned fluid is returned from the right-hand ends of these cylinders through line 124a which was placed in communication through valve 123 with return pipe 118a leading back to the tank.

Upon the energization of line 122 as above mentioned fluid is supplied under pressure not only for the operation of valve 123 but also through line 122b through a valve 126 which is in the position shown since cylinder 81 has not yet moved, energizing line 122c and forcing a valve controlling arm 122d downwardly, this valve being controlled by a fluid operated piston. As the arm 122d moves down, fluid is exhausted from the lower side of its energizing cylinder through line 122e and through line 122f which connects to 122a, at that time in communication with the tank. Downward movement of the valve controlling arm 122d pulls downwardly on a lug 170a fixed on a valve 170 so that passages through valve 170 are then as shown in dotted lines. Thus the fluid will now be supplied from a pressure line 170b to a line 170c leading to the right-hand side of a valve 131, similar in construction to the valve 117a. The piston of valve 131 is thus moved to the left immediately after the piston of valve 123 moves to the right. Such movement of the control piston of valve 131 places the supply pipe 112c in communication with line 132, and fluid is thus supplied to the left-hand end of the cylinder 45 to produce downward movement of the head of the machine, this downward movement of the head taking place immediately after the advancing movement of the fixtures is completed and even before the rotating movement of the transfer table is completed.

Figures 18, 19, 21:
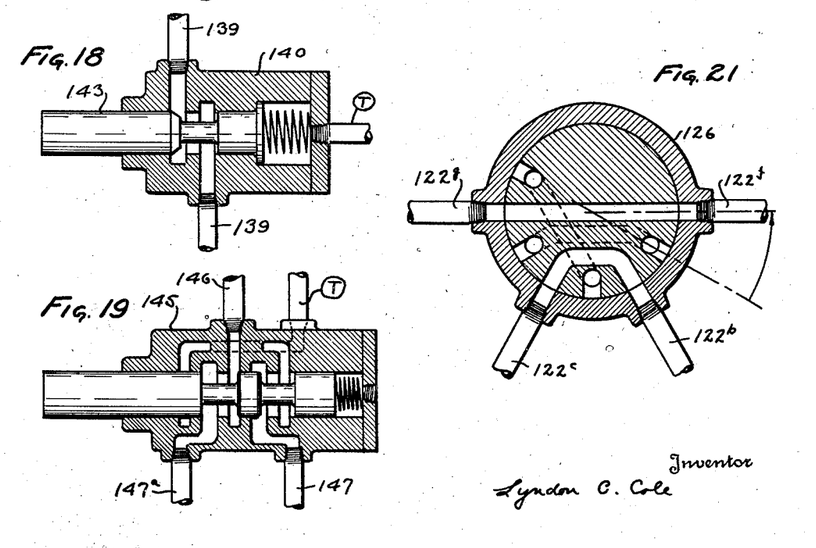
Fig. 18 is a sectional view through the valve 140.
Fig. 19 is a sectional view through the valve 145.
Fig. 21 is a sectional view through the valve 126.

Immediately after the start of the descending movements of the head of the machine, the piston 81 has moved some little distance to the left. This piston is provided with a lug 125 adapted to operate a valve 126, shown in Fig. 21. Movement of the cylinder 81 to the left, therefore, first throws valve 126 counter-clockwise establishing flow through the valve as indicated in dotted lines in order to immediately reset or lift the arm 122d, fluid being supplied through the energized lines 122 and 122b to line 122e and pushing upwardly on the piston controlling arm 122d, arm 122d snapping past the lug 170a which is still lowered, without effect.

When the line 122c is energized as above described so as to pull down on the arm 122d, at the same time fluid is supplied through the line 122g to the upper side of a cylinder 178 pulling downwardly on an arm 178a and thus rotating the valve 117 clockwise back to its original position so that fluid will be supplied from line 112d to the right-hand side of valve 117a returning this valve to its original position and thus supplying fluid through the valve as shown by the arrow from line 112c to line 128. Fluid is thus supplied to the left-hand end of cylinder 88 and to the right-hand side of the cylinder 88a so that they are promptly returned to their initial positions ready to engage other fixtures. Fluid at the same time is returned from the other sides of the cylinders through line 118 now connected through the valve 117a and through line 118a back to the tank.

The rotary pilot valve 120 alternately admits pressure from the pilot line 121 to the lines 122 and 122a upon each 45 degree clockwise movement of the valve, the return movement of the piston 88 being without effect on the valve as the finger 119 is pivotally supported so it can swing back when the cylinder 88 is moved to the left. The valve 123 is therefore caused to alternately supply pressure first to one end of cylinders 81 and 81a and then to the other and to cause reverse movements of each transfer table. When the line 122a is energized the line 122f serves as a source of supply for fluid which can pass through the valve 126 to the line 122e for operation of the arm 122d and the valve 170. When the line 122 is energized the flow of fluid is from the line 122 to the line 122e.

When the piston of valve 131 moves to the left as before mentioned, line 132 is energized and the piston 46 moves to the right causing counter-clockwise movement of two arms 133 and 133a which are fixed, in axially offset positions, to gear 43. During the final movement of the piston 46 to the right, arm 133 engages a finger 133b of valve 134, moving the valve clockwise about 45 degrees from the position shown. This movement of the valve 134 opens the passages through the valve as shown in dotted lines, placing a line 135 in communication with the line 149 extending to the right-hand side of a valve 137, similar in construction to valve 117a, and also to the right-hand of a valve 175, similar in construction to the valve 117a. The pistons of these valves thus move to the left, valve 137 then supplying fluid from a controlled pressure line 138 to a line 139 leading through valve 140 to the broach advancing or ram cylinder 56. This causes the broach carriage to move to the right, its rate of movement depending on the amount of flow obtaining through the controlled line 138 which is provided with a flow control means 141 to produce the desired speed of movement of the broach. At the same time that line 139 is placed in communication with line 138, the pump 110' is placed, through line 112a, in communication with line 139a so that all four pumps are effective in moving the ram cylinder during the broaching operation.

The ram continues moving to the right until stop 142 on the broach carriage engages a projection 143 of valve 140, closing valve 140 against down flow of fluid although upflow is permitted through a suitable spring pressed closure providing for one-way passage of fluid at all times. When the valve 140 is closed as above mentioned, the ram stops. At the same time the valve 140 is closed, a second stop 144 operates a valve 145 thus placing the pilot pressure line 146 in communication with a line 147 which extends to the upper side of a cylinder 170d for the control of an arm 170e. The flow of fluid through line 147 causes the arm 170e to descend and operate against a lug 170f which resets valve 170 and re-establishes the fluid passages through valve 170 os shown in solid lines. Normally the piston which controls arm 170e is held up by pressure prevailing through line 147a extending to the valve 145, this line being always open for flow through line 147a except when the ram stop 144 is engaged with it. When the ram engages the stop on valve 145 the line 147a is open to the tank through a line 147b.

It will thus be seen that after the ram has completed its movement to the right, the valve 170 is reset to its original position and it will then open the passage from line 170b to line 170f' leading to the left-hand side of valve 131. The valve 131 is thus operated to supply fluid from line 112c to line 148 causing the rack to move to the left and thus raising the head. At the end of the raising movement of the head the arm 133a will be moved clockwise far enough to contact a finger 133c on valve 134 thus returning the valve 134 to its original position so that fluid is again supplied to line 136 leading to the left-hand side of valves 137 and 175. This operation of the two valves 137 and 175 shuts off the pressure supply to the line 139 and connects that line through the return pipes 176 back to the tank. At the same time a fluid connection is made through valve 137 from line 138 to a line 177 extending back to the tank so that the three pumps 110 are merely recirculating fluid without effect. However, the fourth pump 110' supplies fluid through the valve 175 to line 150, a single pump furnishing sufficient flow and pressure inasmuch as the diameter of the returning cylinder is considerably less than that of the advancing cylinder of the broach. Fluid passing through line 150 flows through valve 151, which is open, and through line 152 into the cylinder 63 thus returning the broach to its initial position after the head has been moved up away from the fixture. In line 152 is a choke and check valve 152a which provides a restricted flow from the cylinder 63 so that the speed of advancing movements of the broach is controlled and to some extent restricted by flow of fluid out of cylinder 63. However, the valve 152a provides for free flow of fluid into cylinder 63. At the end of the returning movement of the broach carriage, a stop 154 automatically closes the valve 151 against downwards flow of fluid or to cylinder 63 although up flow of fluid is always permitted through a spring controlled closure in this valve so that the contents of the cylinder 63 can be returned to the tank through line 176 after operation of the valve 175 for such return flow.

It will be understood that the control lever 116 is suitably mounted for the control of machine 10. A valve similar to valve 117a is provided for each of the other machines in the line in which the machine 10 is included, the right and left-hand sides of such other similar valves, all being connected in parallel to the lines 112a and 112b respectively through suitable connections 117d. These other valves operate similar control systems for the various other machines for their moving elements so that all of the machines in the line can be started at the same time and their work completed automatically. The moving parts of the several machines are then returned to their initial positions and after a sufficient time interval has elapsed for all operations of the various machines to be completed, the operator again throws the handle 116 to cause another feeding step of the line of fixtures immediately followed by the indexing movement of the tables and the automatic operation of the various machines. The control means 116 of the valve 117 forms a single control device for initiating the movements of all the various machines in the line.

While the process and apparatus herein described constitute preferred embodiments of the invention, it is to be understood that the invention is not limited to this precise process and apparatus, and that changes may be made therein without departing from the scope of the invention which is defined in the appended claims.

What is claimed is:

1. In combination in an apparatus for machining work pieces, a machine line adapted to perform different successive cutting operations on work pieces, a line of similar fixtures each adapted to receive and hold a work piece, means for advancing the fixtures step by step through the machine line, and means for rotating a fixture at an end of the line about an axis parallel to its line of advance.

2. In combination in an apparatus for machining work pieces, a plurality of machines arranged in line and adapted to perform different cutting operations on work pieces, each machine having a cutting tool head, a continuous line of similar fixtures each adapted to receive and hold a work piece, a track passing through and extending between the machines, common means for advancing the fixtures step by step along the track, and means on each cutting tool head for individually locating a fixture opposite thereto at the end of an advancing step.

3. The combination in an apparatus for machining work pieces, a plurality of machines adapted to perform different cutting operations on work pieces, a line of similar individual fixtures each adapted to receive and hold a work piece and arranged in series one after another, guide means for the support of said fixtures, said guide means extending through the machines and from one machine to another, rotatable transfer means for moving a fixture laterally out of its line of advance, and guide means for the return of the fixtures in a line parallel but opposite to the line of advance.

4. The combination in an apparatus for machining work pieces, a plurality of machines adapted to perform different cutting operations on work pieces and including a broaching and drilling machines, a line of similar fixtures each adapted to receive and hold a work piece, guide means for the support of said fixtures, said guide means extending through the machines and from one machine to another, each machine having a head movable toward a fixture, means on each said head for individually locating a fixture opposite thereto, transfer means for moving a fixture out of its line of advance, and common means for advancing said fixtures step by step.

5. In combination in an apparatus for machining work pieces, a plurality of machines adapted to perform successive cutting operations on work pieces, guide means extending through said machines and from one machine to another, a line of similar fixtures on said guide means each fixture being adapted to receive and support a work piece, means for feeding the fixtures step by step along said guide means to advance each fixture to a succeeding machine locating means on each fixture for the location of the work in predetermined position on the fixture, and cooperating locating devices on the machines and on the fixtures for the individual location of the fixtures in a predetermined relationship in any machine and for simultaneously urging a fixture securely against said guide means, a machine tool on each machine, and means for moving said machine tools toward the fixtures for engagement with the work piece.

6. A machine of the character described comprising a frame having a stationary fixture guide, a fixture mounted for bodily sliding movement on said guide and adapted to receive and hold a work piece, a head movably mounted on said frame, means for moving said fixture along said guide to a predetermined approximate position with respect to said head, means for moving said head toward said fixture, said head having a portion adapted to be brought into engagement with opposite sides of the fixture for definitely locating the fixture and for securing the fixture against the guide, a tool carried by said head, and means for operating said tool.

7. A broach machine of the character described comprising a frame, a fixture guide fixed on said frame, a fixture slidably mounted for rectilinear movement on said guide, a head movable on said frame in a direction toward said fixture, said head having a portion adapted to be brought into engagement with said fixture for definitely locating said fixture and for holding said fixture securely against said guide, a surfacing broach movably mounted on said frame, means for moving said surfacing broach in one direction for cutting the work, and means for moving the fixture along said guide.

8. A machine of the character described comprising a frame, a fixture guide on said frame, a fixture slidably mounted on said guide for rectilinear movement thereon, a head movable on said frame in a direction toward said fixture, a broach carriage movably mounted on said head, means for moving said broach carriage in one direction for cutting the work, symmetrically opposed locating means on said fixture and cooperating locating means on said head for the location of the fixture in the machine, and means for periodically moving the fixture along said guide.

9. A machine of the class described comprising a frame, a fixture guide in said frame, a fixture slidably supported upon said guide and having clamping means adapted to hold a work piece, a head movably mounted on said frame, means on said head engageable with the fixture for holding the fixture against said guide, toggle means for raising and lowering said head, a broaching tool mounted for reciprocatory movement in said head, and means for operating said broaching tool in said head.

10. A broaching machine of the character described comprising a frame, a work fixture guide in said frame, a series of fixtures slidably supported for horizontal movement upon said guide and each having work clamping means adapted to hold a work piece, means for periodically moving the fixtures along said guide to advance the fixtures successively to a predetermined position in said machine, and a surface broaching tool carried by said frame for horizontal movement in a direction substantially transverse to the direction of movement of said fixture and engageable with a work piece positioned in said predetermined position.

11. A machine of the character described comprising upright members, a head movably mounted thereon, a work carrying fixture, guide means slidably supporting said fixture, a cutting tool carried by said head, means for operating said cutting tool, and means for moving said head towards and against said fixture to a predetermined position in which a predetermined force is exerted downwardly by the head on the fixture which is greater than the upward force on the head created by engagement of the cutting tool with the work.

12. A broach machine of the character described comprising a frame, a fixture guide on said frame, a fixture movably mounted on said guide having means adapted to secure a work piece in position thereon, a head movably mounted on said frame, fluid pressure means for moving said head toward said fixture guide, a surface broaching tool carried by said head, and means for reciprocating said broaching tool in said head, the direction of movement of the broaching tool being substantially transverse to the direction of the movement of the fixture along said guide.

13. A machine of the class described comprising a frame, a fixture guide in said frame, a fixture on said guide adapted to hold a work piece, a head carried by said frame, a tool carriage on said head, transfer means rotatable about an axis spaced from and parallel to the line of advance for receiving the fixture in a position adjacent the operating position, and means for moving said transfer means to invert the fixture.

14. A machine of the character described comprising a frame, a fixture guide in said frame, a fixture on said guide adapted to receive and hold a work piece, means for moving said fixture along said guide, means on said frame for performing a cutting operation on the work piece, a rotatable table movable about an axis parallel to the line of advance of the fixture along said guide, means for rotating said table, and a return guide for the fixture, said table forming continuations of both said guides.

15. A broaching machine of the class described comprising a frame, a guide in said frame, work feeding means to advance successive work pieces along said guide to a predetermined position in said machine, a head movably mounted on said frame, means on said head for locating and holding a work piece in position, means for raising and lowering said head, a broaching tool slidably guided for horizontal reciprocatory movement in said head, and means for operating said broaching tool.

16. In combination in an apparatus for machining work pieces, a plurality of machines including broaching and milling machines arranged in line and adapted to perform different cutting operations on work pieces, each machine having a cutting tool head movable into cutting position and retractible to provide for feeding movement of the work pieces, said line of machines having a loading station, a cutting station in each cutting machine and an unloading station at the end of the line, a track passing through and extending between the machines, common means for advancing the work pieces step by step along the track and means on each cutting tool head for individually locating a work piece opposite thereto at the end of an advancing step.

LYNDON C. COLE.